US010587338B2

(12) United States Patent
Miao et al.

(10) Patent No.: US 10,587,338 B2
(45) Date of Patent: Mar. 10, 2020

(54) COMMUNICATION METHOD IN TIME DIVISION DUPLEX SYSTEM, BASE STATION, AND USER EQUIPMENT

(71) Applicant: Huawei Technologies Co., Ltd., Shenzhen (CN)

(72) Inventors: Jinhua Miao, Beijing (CN); Wei Quan, Beijing (CN); Xiaodong Yang, Shenzhen (CN); Jian Zhang, Beijing (CN); Bingzhao Li, Beijing (CN); Zhenxing Hu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/720,673

(22) Filed: Sep. 29, 2017

(65) Prior Publication Data

US 2018/0026714 A1 Jan. 25, 2018

Related U.S. Application Data

(63) Continuation of application No. PCT/CN2015/075589, filed on Mar. 31, 2015.

(51) Int. Cl.
*H04B 7/26* (2006.01)

(52) U.S. Cl.
CPC ......... *H04B 7/2656* (2013.01); *H04B 7/2653* (2013.01); *H04B 7/2659* (2013.01); *H04B 7/2681* (2013.01)

(58) Field of Classification Search
CPC .... H04B 7/2656; H04B 7/2653; H04B 7/265; H04B 7/2659; H04B 7/2681

(Continued)

(56) References Cited

U.S. PATENT DOCUMENTS 8,472,465 B2 6/2013 Suo et al.
8,681,706 B2 3/2014 Pan et al.
(Continued)

FOREIGN PATENT DOCUMENTS

CN 101237313 A 8/2008
CN 101389053 A 3/2009
(Continued)

OTHER PUBLICATIONS

"Physical channel timing relationships for MTC," 3GPP TSG-RAN WG1 Meeting #79, San Francisco, USA, XP050875652, R1-144558, pp. 1-4, 3rd Generation Partnership Project, Valbonne, France (Nov. 17-21, 2014).

(Continued)

*Primary Examiner* — Rownak Islam
(74) *Attorney, Agent, or Firm* — Leydig, Voit & Mayer, Ltd.

(57) ABSTRACT

The present invention provides a communication method includes: determining, by a base station, radio frame configuration information; sending, by the base station, the determined radio frame configuration information to user equipment UE, where the radio frame configuration information is used to instruct the UE to set at least one of N consecutive downlink subframes of one radio frame as a first subframe, and/or the radio frame configuration information is used to instruct the UE to set at least one of M consecutive uplink subframes of one radio frame as a second subframe, where the first subframe is used for uplink service transmission, the second subframe is used for downlink service transmission, and N and M are positive integers not less than 2; and communicating, by the base station, with the UE by using a radio frame configured according to the radio frame configuration information.

20 Claims, 8 Drawing Sheets

(58) Field of Classification Search
USPC .................................................. 370/336, 337
See application file for complete search history.

(56) References Cited

U.S. PATENT DOCUMENTS

| | | | |
|---|---|---|---|
| 2008/0225802 A1 | 9/2008 | Sun et al. | |
| 2010/0246456 A1 | 9/2010 | Suo et al. | |
| 2013/0343239 A1* | 12/2013 | Damnjanovic | H04L 5/001 370/280 |
| 2014/0092921 A1 | 4/2014 | Seo et al. | |
| 2014/0293842 A1 | 10/2014 | He et al. | |
| 2015/0085723 A1 | 3/2015 | Chen et al. | |
| 2015/0349931 A1* | 12/2015 | Damnjanovic | H04L 5/0007 370/280 |
| 2015/0365968 A1* | 12/2015 | Kim | H04B 7/2656 370/280 |
| 2017/0244536 A1* | 8/2017 | Li | H04W 72/00 |

FOREIGN PATENT DOCUMENTS

| | | |
|---|---|---|
| CN | 101399632 A | 4/2009 |
| CN | 101425845 A | 5/2009 |
| CN | 101567775 A | 10/2009 |
| EP | 2234292 A1 | 9/2010 |
| EP | 2802091 A1 | 11/2014 |
| EP | 2806701 A1 | 11/2014 |
| EP | 2833571 A1 | 2/2015 |
| EP | 2849519 A1 | 3/2015 |
| JP | 2009503958 A | 1/2009 |
| WO | 2013111607 A1 | 8/2013 |
| WO | 2013141770 A1 | 9/2013 |
| WO | 2013178085 A1 | 12/2013 |
| WO | 2014121833 A1 | 8/2014 |

OTHER PUBLICATIONS

JP/2017-546778, Office Action, dated Apr. 10, 2019.

* cited by examiner

COMMUNICATION METHOD IN TIME DIVISION DUPLEX SYSTEM, BASE STATION, AND USER EQUIPMENT

CROSS-REFERENCE TO RELATED APPLICATIONS

This application is a continuation of International Application No. PCT/CN2015/075589, filed on Mar. 31, 2015, the disclosure of which is hereby incorporated by reference in its entirety.

TECHNICAL FIELD

The present invention relates to the field of communications technologies, and in particular, to a communication method in a time division duplex system, a base station, and user equipment.

BACKGROUND

A Long Term Evolution (LTE) system supports a time division duplex (TDD) manner. That is, an uplink (UL) and a downlink (DL) use different timeslots of a same carrier. The uplink is used for uplink communication. That is, if user equipment (UE) has data to be sent to a base station, the user equipment sends the data by using the uplink. The downlink is used for downlink communication. That is, if a base station has data to be sent to a user equipment, the base station sends the data by using the downlink.

A round trip time (RTT) is an important indicator for measuring performance of a wireless communications system, and generally means a period from a time at which a transmit end sends data to a time at which the transmit end receives an acknowledgement from a receive end.

In a TDD system, data scheduling is generally performed in a hybrid automatic repeat request (HARQ) manner. For one HARQ process, after sending data, a transmit end does not send a next data packet until a preset maximum feedback latency elapses. Therefore, if an ACK can be received as soon as possible, a time interval at which data packets are sent in one HARQ process can be shortened, an RTT can be reduced, and data transmission efficiency can be improved.

Currently, there is still no method that can effectively reduce an RTT of a TDD communications system and improve data transmission efficiency.

SUMMARY

Embodiments of the present invention provide a communication method in a time division duplex system, a base station, and user equipment, so as to effectively reduce an RTT and improve data transmission efficiency.

According to a first aspect, an embodiment of the present invention provides a communication method in a time division duplex system, where the method includes:

determining, by a base station, radio frame configuration information;

sending, by the base station, the determined radio frame configuration information to user equipment UE, where the radio frame configuration information is used to instruct the UE to set at least one of N consecutive downlink subframes of one radio frame as a first subframe, and/or the radio frame configuration information is used to instruct the UE to set at least one of M consecutive uplink subframes of one radio frame as a second subframe, where the first subframe is used for uplink service transmission, the second subframe is used for downlink service transmission, and N and M are positive integers not less than 2; and communicating, by the base station, with the UE by using a radio frame configured according to the radio frame configuration information.

With reference to the first aspect, in a first possible implementation of the first aspect, the first subframe includes a guard period and at least one first symbol used for uplink service transmission, and the guard period precedes the first symbol.

With reference to the first possible implementation of the first aspect, in a second possible implementation of the first aspect, the first subframe includes C symbols, where the first x symbols are the guard period, the last y symbols are an uplink pilot timeslot used for uplink service transmission, $x=C/2$, and $y=C/2$; or the first subframe includes C symbols, where the first x symbols are the guard period, the last y symbols are an uplink pilot timeslot used for uplink service transmission, $C=x+y$, and $x>C/2$.

With reference to the first possible implementation of the first aspect, in a third possible implementation of the first aspect, the first subframe further includes at least one second symbol used for downlink service transmission, and the second symbol precedes the guard period.

With reference to the third possible implementation of the first aspect, in a fourth possible implementation of the first aspect, the first subframe includes C symbols, where the first x symbols are a downlink pilot timeslot used for downlink service transmission, the last y symbols are an uplink pilot timeslot used for uplink service transmission, the middle z symbols are the guard period, $C=x+y+z$, and $x \leq C/2$; or the first subframe includes C symbols, where the first x symbols are a downlink pilot timeslot used for downlink service transmission, the last y symbols are an uplink pilot timeslot used for uplink service transmission, the middle z symbols are the guard period, $C=x+y+z$, $x<C/2$, and $y=C/2$.

With reference to any one of the first aspect, or the first to the fourth possible implementations of the first aspect, in a fifth possible implementation of the first aspect, the second subframe includes a guard period and at least one third symbol used for downlink service transmission, and the guard period is preceded by the third symbol.

With reference to the fifth possible implementation of the first aspect, in a sixth possible implementation of the first aspect, the second subframe includes P symbols, where the first a symbols are a downlink pilot timeslot used for downlink service transmission, the last b symbols are the guard period, $a=P/2$, and $b=P/2$; or the second subframe includes P symbols, where the first a symbols are a downlink pilot timeslot used for downlink service transmission, the last b symbols are the guard period, $P=a+b$, and $a>P/2$.

With reference to the fifth possible implementation of the first aspect, in a seventh possible implementation of the first aspect, the second subframe further includes at least one fourth symbol used for uplink service transmission, and the fourth symbol is preceded by the guard period.

With reference to the seventh possible implementation of the first aspect, in an eighth possible implementation of the first aspect, the second subframe includes P symbols, where the first a symbols are a downlink pilot timeslot used for downlink service transmission, the last b symbols are an uplink pilot timeslot used for uplink service transmission, the middle w symbols are the guard period, $P=a+b+w$, and $a \leq P/2$; or the second subframe includes P symbols, where the first a symbols are a downlink pilot timeslot used for downlink service transmission, the last b symbols are an uplink pilot timeslot used for uplink service transmission, the middle w symbols are the guard period, P=a+b+w, a<P/2, and b=P/2.

With reference to any one of the first aspect, or the first to the eighth possible implementations of the first aspect, in a ninth possible implementation of the first aspect, the sending, by the base station, the radio frame configuration information to UE includes:

sending, by the base station, the radio frame configuration information to the UE by using a broadcast message; or sending, by the base station, the radio frame configuration information to the UE by using radio resource control RRC dedicated signaling, Media Access Control MAC signaling, or physical downlink control channel PDCCH signaling.

According to a second aspect, an embodiment of the present invention further provides a communication method in a time division duplex system, where the method includes:

receiving, by user equipment UE, radio frame configuration information sent by a base station;

according to the radio frame configuration information, determining, by the UE, that at least one of N consecutive downlink subframes of one radio frame is configured as a first subframe, and/or determining that at least one of M consecutive uplink subframes of one radio frame is configured as a second subframe, where the first subframe is used for uplink service transmission, the second subframe is used for downlink service transmission, and N and M are positive integers not less than 2; and communicating, by the UE, with the base station by using a radio frame determined according to the radio frame configuration information.

With reference to the second aspect, in a first possible implementation of the second aspect, the first subframe includes a guard period and at least one first symbol used for uplink service transmission, and the guard period precedes the first symbol.

With reference to the first possible implementation of the second aspect, in a second possible implementation of the second aspect, the first subframe includes C symbols, where the first x symbols are the guard period, the last y symbols are an uplink pilot timeslot used for uplink service transmission, x=C/2, and y=C/2; or the first subframe includes C symbols, where the first x symbols are the guard period, the last y symbols are an uplink pilot timeslot used for uplink service transmission, C=x+y, and x>C/2.

With reference to the first possible implementation of the second aspect, in a third possible implementation of the second aspect, the first subframe further includes at least one second symbol used for downlink service transmission, and the second symbol precedes the guard period.

With reference to the third possible implementation of the second aspect, in a fourth possible implementation of the second aspect, the first subframe includes C symbols, where the first x symbols are a downlink pilot timeslot used for downlink service transmission, the last y symbols are an uplink pilot timeslot used for uplink service transmission, the middle z symbols are the guard period, C=x+y+z, and x≤C/2; or the first subframe includes C symbols, where the first x symbols are a downlink pilot timeslot used for downlink service transmission, the last y symbols are an uplink pilot timeslot used for uplink service transmission, the middle z symbols are the guard period, C=x+y+z, x<C/2, and y=C/2.

With reference to any one of the second aspect, or the first to the fourth possible implementations of the first aspect, in a fifth possible implementation of the second aspect, the second subframe includes a guard period and at least one third symbol used for downlink service transmission, and the guard period is preceded by the third symbol.

With reference to the fifth possible implementation of the second aspect, in a sixth possible implementation of the second aspect, the second subframe includes P symbols, where the first a symbols are a downlink pilot timeslot used for downlink service transmission, the last b symbols are the guard period, a=P/2, and b=P/2; or the second subframe includes P symbols, where the first a symbols are a downlink pilot timeslot used for downlink service transmission, the last b symbols are the guard period, P=a+b, and a>P/2.

With reference to the fifth possible implementation of the second aspect, in a seventh possible implementation of the second aspect, the second subframe further includes at least one fourth symbol used for uplink service transmission, and the fourth symbol is preceded by the guard period.

With reference to the seventh possible implementation of the second aspect, in an eighth possible implementation of the second aspect, the second subframe includes P symbols, where the first a symbols are a downlink pilot timeslot used for downlink service transmission, the last b symbols are an uplink pilot timeslot used for uplink service transmission, the middle w symbols are the guard period, P=a+b+w, and a≤P/2; or the second subframe includes P symbols, where the first a symbols are a downlink pilot timeslot used for downlink service transmission, the last b symbols are an uplink pilot timeslot used for uplink service transmission, the middle w symbols are the guard period, P=a+b+w, a<P/2, and b=P/2.

According to a third aspect, an embodiment of the present invention further provides a base station, including:

a determining unit, configured to determine radio frame configuration information;

a sending unit, configured to send the radio frame configuration information determined by the determining unit to user equipment UE, where the radio frame configuration information is used to instruct the UE to set at least one of N consecutive downlink subframes of one radio frame as a first subframe, and/or the radio frame configuration information is used to instruct the UE to set at least one of M consecutive uplink subframes of one radio frame as a second subframe, where the first subframe is used for uplink service transmission, the second subframe is used for downlink service transmission, and N and M are positive integers not less than 2; and a communication unit, configured to communicate with the UE by using a radio frame configured according to the radio frame configuration information.

With reference to the third aspect, in a first possible implementation of the third aspect, the first subframe includes a guard period and at least one first symbol used for uplink service transmission, and the guard period precedes the first symbol.

With reference to the first possible implementation of the third aspect, in a second possible implementation of the third aspect, the first subframe includes C symbols, where the first x symbols are the guard period, the last y symbols are an uplink pilot timeslot used for uplink service transmission, x=C/2, and y=C/2; or the first subframe includes C symbols, where the first x symbols are the guard period, the last y symbols are an uplink pilot timeslot used for uplink service transmission, C=x+y, and x>C/2.

With reference to the first possible implementation of the third aspect, in a third possible implementation of the third aspect, the first subframe further includes at least one second symbol used for downlink service transmission, and the second symbol precedes the guard period.

With reference to the third possible implementation of the third aspect, in a fourth possible implementation of the third aspect, the first subframe includes C symbols, where the first x symbols are a downlink pilot timeslot used for downlink service transmission, the last y symbols are an uplink pilot timeslot used for uplink service transmission, the middle z symbols are the guard period, C=x+y+z, and x≤C/2; or the first subframe includes C symbols, where the first x symbols are a downlink pilot timeslot used for downlink service transmission, the last y symbols are an uplink pilot timeslot used for uplink service transmission, the middle z symbols are the guard period, C=x+y+z, x<C/2, and y=C/2.

With reference to any one of the third aspect, or the first to the fourth possible implementations of the third aspect, in a fifth possible implementation of the third aspect, the second subframe includes a guard period and at least one third symbol used for downlink service transmission, and the guard period is preceded by the third symbol.

With reference to the fifth possible implementation of the third aspect, in a sixth possible implementation of the third aspect, the second subframe includes P symbols, where the first a symbols are a downlink pilot timeslot used for downlink service transmission, the last b symbols are the guard period, a=P/2, and b=P/2; or the second subframe includes P symbols, where the first a symbols are a downlink pilot timeslot used for downlink service transmission, the last b symbols are the guard period, P=a+b, and a>P/2.

With reference to the fifth possible implementation of the third aspect, in a seventh possible implementation of the third aspect, the second subframe further includes at least one fourth symbol used for uplink service transmission, and the fourth symbol is preceded by the guard period.

With reference to the seventh possible implementation of the third aspect, in an eighth possible implementation of the third aspect, the second subframe includes P symbols, where the first a symbols are a downlink pilot timeslot used for downlink service transmission, the last b symbols are an uplink pilot timeslot used for uplink service transmission, the middle w symbols are the guard period, P=a+b+w, and a≤P/2; or the second subframe includes P symbols, where the first a symbols are a downlink pilot timeslot used for downlink service transmission, the last b symbols are an uplink pilot timeslot used for uplink service transmission, the middle w symbols are the guard period, P=a+b+w, a<P/2, and b=P/2.

With reference to any one of the third aspect, or the first to the eighth possible implementations of the third aspect, in a ninth possible implementation of the third aspect, the sending unit is specifically configured to:

send, for the base station, the radio frame configuration information to the UE by using a broadcast message; or send, for the base station, the radio frame configuration information to the UE by using radio resource control RRC dedicated signaling, Media Access Control MAC signaling, or physical downlink control channel PDCCH signaling.

According to a fourth aspect, an embodiment of the present invention further provides user equipment, including:

a receiving unit, configured to receive radio frame configuration information sent by a base station;

a determining unit, configured to: according to the radio frame configuration information, determine that at least one of N consecutive downlink subframes of one radio frame is configured as a first subframe, and/or determine that at least one of M consecutive uplink subframes of one radio frame is configured as a second subframe, where the first subframe is used for uplink service transmission, the second subframe is used for downlink service transmission, and N and M are positive integers not less than 2; and a communication unit, configured to communicate with the base station by using a radio frame determined according to the radio frame configuration information.

With reference to the fourth aspect, in a first possible implementation of the fourth aspect, the first subframe includes a guard period and at least one first symbol used for uplink service transmission, and the guard period precedes the first symbol.

With reference to the first possible implementation of the fourth aspect, in a second possible implementation of the fourth aspect, the first subframe includes C symbols, where the first x symbols are the guard period, the last y symbols are an uplink pilot timeslot used for uplink service transmission, x=C/2, and y=C/2; or the first subframe includes C symbols, where the first x symbols are the guard period, the last y symbols are an uplink pilot timeslot used for uplink service transmission, C=x+y, and x>C/2.

With reference to the first possible implementation of the fourth aspect, in a third possible implementation of the fourth aspect, the first subframe further includes at least one second symbol used for downlink service transmission, and the second symbol precedes the guard period.

With reference to the third possible implementation of the fourth aspect, in a fourth possible implementation of the fourth aspect, the first subframe includes C symbols, where the first x symbols are a downlink pilot timeslot used for downlink service transmission, the last y symbols are an uplink pilot timeslot used for uplink service transmission, the middle z symbols are the guard period, C=x+y+z, and x≤C/2; or the first subframe includes C symbols, where the first x symbols are a downlink pilot timeslot used for downlink service transmission, the last y symbols are an uplink pilot timeslot used for uplink service transmission, the middle z symbols are the guard period, C=x+y+z, x<C/2, and y=C/2.

With reference to any one of the fourth aspect, or the first to the fourth possible implementations of the fourth aspect, in a fifth possible implementation of the fourth aspect, the second subframe includes a guard period and at least one third symbol used for downlink service transmission, and the guard period is preceded by the third symbol.

With reference to the fifth possible implementation of the fourth aspect, in a sixth possible implementation of the fourth aspect, the second subframe includes P symbols, where the first a symbols are a downlink pilot timeslot used for downlink service transmission, the last b symbols are the guard period, a=P/2, and b=P/2; or the second subframe includes P symbols, where the first a symbols are a downlink pilot timeslot used for downlink service transmission, the last b symbols are the guard period, P=a+b, and a>P/2.

With reference to the fifth possible implementation of the fourth aspect, in a seventh possible implementation of the fourth aspect, the second subframe further includes at least one fourth symbol used for uplink service transmission, and the fourth symbol is preceded by the guard period.

With reference to the seventh possible implementation of the fourth aspect, in an eighth possible implementation of the fourth aspect, the second subframe includes P symbols, where the first a symbols are a downlink pilot timeslot used for downlink service transmission, the last b symbols are an uplink pilot timeslot used for uplink service transmission, the middle w symbols are the guard period, P=a+b+w, and a≤P/2; or the second subframe includes P symbols, where the first a symbols are a downlink pilot timeslot used for downlink service transmission, the last b symbols are an uplink pilot timeslot used for uplink service transmission, the middle w symbols are the guard period, P=a+b+w, a<P/2, and b=P/2.

According to the embodiments of the present invention, in a TDD system, radio frame duration is kept unchanged, and in radio frame configuration, at least one of not less than two consecutive downlink subframes of one radio frame is configured as a first subframe, and/or at least one of not less than two consecutive uplink subframes of one radio frame is configured as a second subframe, where the first subframe is used for uplink service transmission, and the second subframe is used for downlink service transmission. That is, a group of DL switch points are added to each radio frame. This reduces a time interval for waiting for UL/DL switching in some subframes, thereby reducing a system RTT. For example, after UE receives, in a downlink subframe, downlink data sent by a base station, the UE needs to send feedback information of downlink-data reception to the base station in a subsequent uplink subframe. According to the method provided in the present invention, after UE receives, in a downlink subframe, downlink data sent by a base station, because at least one of at least two consecutive downlink subframes is configured as a first subframe, the UE can send feedback information of downlink-data reception to the base station in the first subframe, instead of waiting until a subsequent uplink subframe to send the feedback information of downlink-data reception to the base station. Therefore, a time interval for waiting for UL/DL switching is shortened, thereby shortening a system RTT.

DESCRIPTION OF EMBODIMENTS

To make the objectives, technical solutions, and advantages of the present invention clearer, the following further describes the present invention in detail with reference to the accompanying drawings. Apparently, the described embodiments are merely some rather than all of the embodiments of the present invention. All other embodiments obtained by a person of ordinary skill in the art based on the embodiments of the present invention without creative efforts shall fall within the protection scope of the present invention.

The embodiments of the present invention provide a communication method in a time division duplex system, a base station, and user equipment, so as to effectively reduce an RTT and improve data transmission efficiency. The method and the apparatuses are based on a same invention idea. Because similar principles are used by the method and the apparatuses to resolve a problem, implementations of the apparatuses and the method may be cross-referenced, and repetition is omitted herein.

In the embodiments of the present invention, a TDD LTE system is used as an example for description. However, this does not mean that the embodiments of the present invention are applicable only to TDD LTE systems.

In TDD LTE systems, TDD configuration is a very important concept. Various channel configurations are implemented according to specific TDD configurations. Therefore, TDD configurations in an existing TDD LTE system are first described before the embodiments of the present invention are described.

Figure 1:
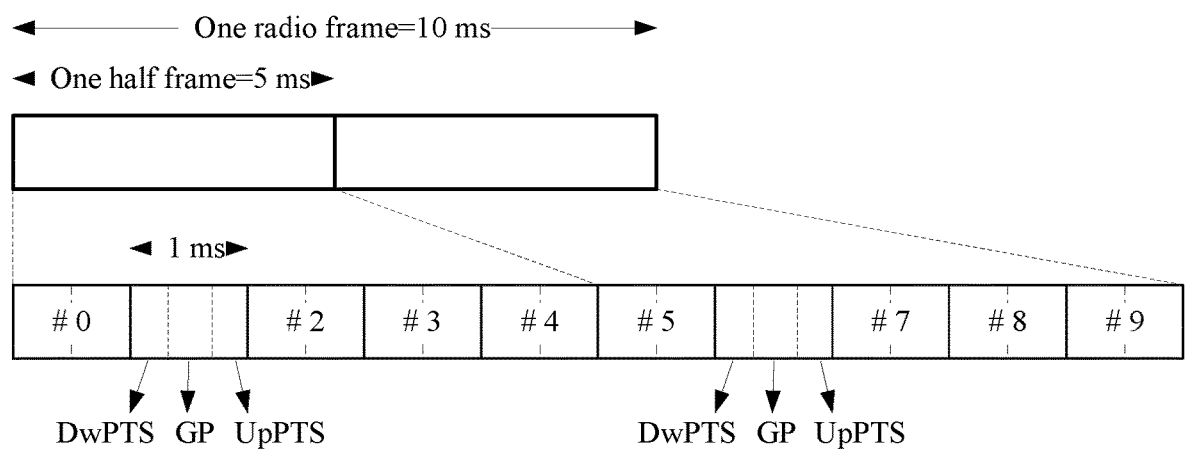
FIG. 1 is a schematic structural diagram of a TDD subframe according to an embodiment of the present invention.

Table 1 is a TDD configuration table of an existing TDD LTE system. As shown in Table 1, in the existing TDD LTE system, there are a total of seven types of TDD configurations: 0 to 6. In the table, "D" represents a downlink subframe, "S" represents a special subframe (S subframe), and "U" represents an uplink subframe (in the following descriptions, meanings of "S", "D", and "U" are the same as the definitions herein, and explanation is not repeated). In Table 1, downlink-to-uplink switch-point periods (Downlink-to-Uplink Switch-point period) of the TDD configurations 0, 1, 2, and 6 are 5 ms, and downlink-to-uplink switch-point periods of the TDD configurations 3 to 5 are 10 ms. FIG. 1 is a structural diagram of an existing subframe.

TABLE 1

| TDD configuration | Downlink-to-uplink switch-point period | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The following specifically describes the embodiments of the present invention with reference to the accompanying drawings.

Figure 2:
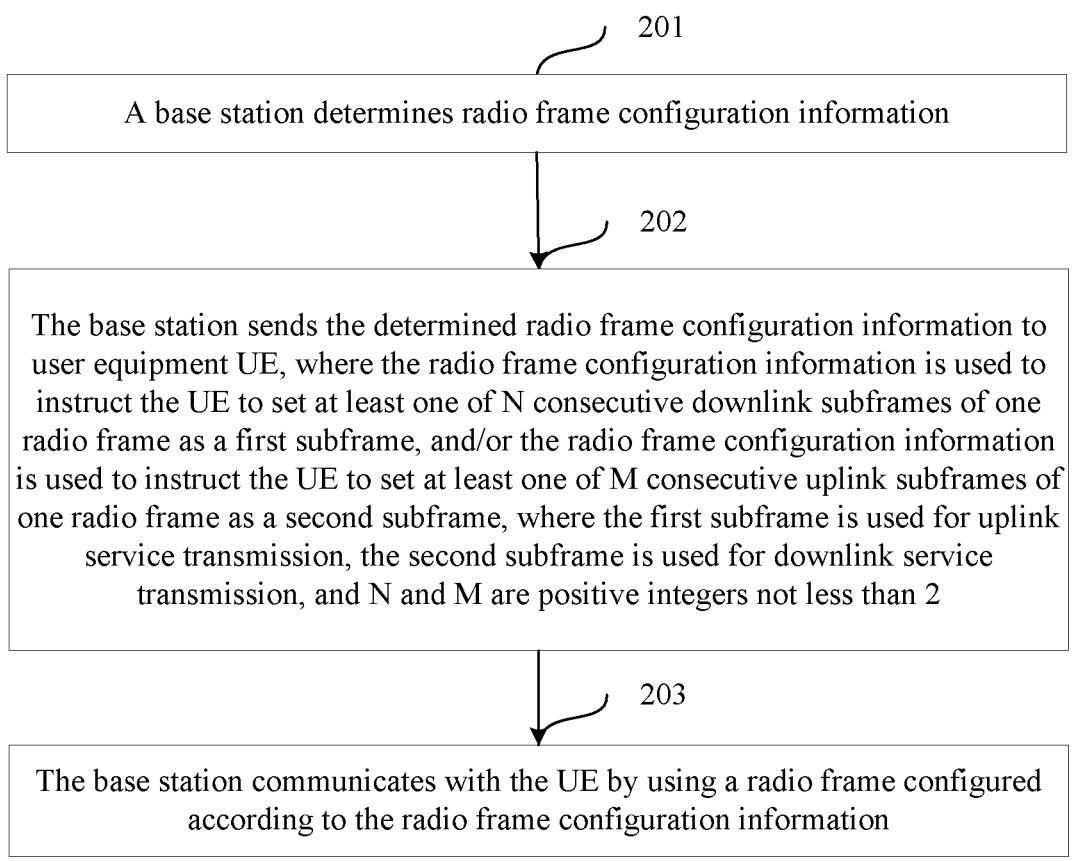
FIG. 2 is a flowchart of a communication method in a time division duplex system according to an embodiment of the present invention.

An embodiment of the present invention provides a communication method in a time division duplex system. As shown in FIG. 2, the method includes the following steps:

Step 201: A base station determines radio frame configuration information.

Step 202: The base station sends the determined radio frame configuration information to user equipment UE, where the radio frame configuration information is used to instruct the UE to set at least one of N consecutive downlink subframes of one radio frame as a first subframe, and/or the radio frame configuration information is used to instruct the UE to set at least one of M consecutive uplink subframes of one radio frame as a second subframe, where the first subframe is used for uplink service transmission, the second subframe is used for downlink service transmission, and N and M are positive integers not less than 2.

Step 203: The base station communicates with the UE by using a radio frame configured according to the radio frame configuration information.

According to the method provided in the foregoing embodiment, after a base station sends downlink data to UE in a downlink subframe, the UE needs to send, after receiving the downlink data, feedback information of downlink-data reception to the base station in a subsequent uplink subframe. According to the method provided in the present invention, after UE receives, in a downlink subframe, downlink data sent by a base station, because at least one of at least two consecutive downlink subframes is configured as a first subframe, the UE can send feedback information of downlink-data reception to the base station in the first subframe, instead of waiting until a subsequent uplink subframe to send the feedback information of downlink-data reception to the base station. Alternatively, after UE sends uplink data to a base station in an uplink subframe, according to the method provided in this embodiment of the present invention, at least one of at least two consecutive uplink subframes is configured as a second subframe, and the base station can send feedback information to the UE in the second subframe, instead of waiting until a downlink subframe to send the feedback information to the UE. In this way, a time interval for waiting for UL/DL switching is shortened, and a system RTT is shortened.

Optionally, the base station may send the determined radio frame configuration information to the UE specifically in the following manner:

The base station sends the radio frame configuration information to the UE by using a broadcast message; or the base station sends the radio frame configuration information to the UE by using radio resource control RRC dedicated signaling, Media Access Control MAC signaling, or physical downlink control channel PDCCH signaling.

Optionally, the first subframe includes a guard period and at least one first symbol used for uplink service transmission, and the guard period precedes the first symbol.

The first subframe may be used for uplink synchronization and uplink and downlink isolation.

Specifically, the first subframe includes C symbols, where the first x symbols are the guard period, the last y symbols are an uplink pilot timeslot used for uplink service transmission, $x=C/2$, and $y=C/2$; or the first subframe includes C symbols, where the first x symbols are the guard period, the last y symbols are an uplink pilot timeslot used for uplink service transmission, $C=x+y$, and $x>C/2$.

Further, the first subframe further includes at least one second symbol used for downlink service transmission, and the second symbol precedes the guard period.

Specifically, the first subframe includes C symbols, where the first x symbols are a downlink pilot timeslot used for downlink service transmission, the last y symbols are an uplink pilot timeslot used for uplink service transmission, the middle z symbols are the guard period, $C=x+y+z$, and $x \leq C/2$; or the first subframe includes C symbols, where the first x symbols are a downlink pilot timeslot used for downlink service transmission, the last y symbols are an uplink pilot timeslot used for uplink service transmission, the middle z symbols are the guard period, $C=x+y+z$, $x<C/2$, and $y=C/2$.

In the first subframe, the second symbol used for downlink service transmission may be specifically used to send a physical downlink control channel (PDCCH), and may be further used to send a physical downlink shared channel (PDSCH). The first symbol used for uplink service transmission may be used to send a sounding reference signal (SRS) or a physical random access channel (PRACH) signal. The guard period is used to isolate the symbol used for uplink service transmission from the symbol used for downlink service transmission, so as to prevent a channel from generating uplink interference to another remote station, determine a coverage area, and further ensure that terminal signals synchronously arrive at the base station.

Optionally, the base station may indicate the first subframe as an MBMS subframe. That the base station communicates with the UE by using a radio frame configured according to the radio frame configuration information may specifically include: The base station transmits MBMS data to the UE by using the indicated MBMS subframe. In this way, first UE that uses a TTI equal to 1 ms does not receive data any more after receiving a downlink control channel in N symbols in the first subframe. When the base station communicates with the UE by using the radio frame configured according to the radio frame configuration information, the base station may further send a common reference signal to the UE by using the first subframe of the configured radio frame, so as to facilitate signal measurement by the UE. In this case, the UE can obtain all required scheduling information and the like from the first few symbols in the MBMS subframe.

For example, the first subframe includes C symbols, where the first x symbols are a downlink pilot timeslot used for downlink service transmission, the last y symbols are an uplink pilot timeslot used for uplink service transmission, the middle z symbols are the guard period, $C=x+y+z$, $x<C/2$, $y=C/2$, and $C=14$. The first UE that uses a TTI equal to 1 ms does not receive data any more after receiving a downlink control channel in the first N symbols in the first subframe. Second UE that uses a TTI less than 1 ms (for example, 0.5 ms) may receive other data in a remaining time of the first subframe if the second UE detects downlink scheduling information for the second UE in the first few symbols in the first subframe. Therefore, compatibility between the first UE and the second UE is ensured, and mutual interference between new-version and old-version UEs that use different TTIs is avoided.

Optionally, the second subframe includes a guard period and at least one third symbol used for downlink service transmission, and the guard period is preceded by the third symbol.

Specifically, the second subframe includes P symbols, where the first a symbols are a downlink pilot timeslot used for downlink service transmission, the last b symbols are the guard period, $a=P/2$, and $b=P/2$; or the second subframe includes P symbols, where the first a symbols are a downlink pilot timeslot used for downlink service transmission, the last b symbols are the guard period, $P=a+b$, and $a>P/2$.

Further, the second subframe further includes at least one fourth symbol used for uplink service transmission, and the fourth symbol is preceded by the guard period.

Specifically, the second subframe includes P symbols, where the first a symbols are a downlink pilot timeslot used for downlink service transmission, the last b symbols are an uplink pilot timeslot used for uplink service transmission, the middle w symbols are the guard period, P=a+b+w, and a≤P/2; or the second subframe includes P symbols, where the first a symbols are a downlink pilot timeslot used for downlink service transmission, the last b symbols are an uplink pilot timeslot used for uplink service transmission, the middle w symbols are the guard period, P=a+b+w, a<P/2, and b=P/2.

In the second subframe, the third symbol used for downlink service transmission may be specifically used to send a PDCCH signal, and may be further used to send a PDSCH signal. The fourth symbol used for uplink service transmission may be used to send an SRS or a PRACH signal. The guard period is used to isolate the symbol used for uplink service transmission from the symbol used for downlink service transmission, so as to prevent a channel from generating uplink interference to another remote station, determine a coverage area, and further ensure that terminal signals synchronously arrive at the base station.

The base station may further send the radio frame configuration information, a radio frame period length, a determined TTI, and other information to another base station, so that each base station determines a location of a subframe used by the base station to communicate with a terminal. This can avoid transmission interference between base stations.

For a case in which the radio frame configuration information is used to instruct the UE to set at least one of N consecutive downlink subframes of one radio frame as a first subframe, descriptions are provided as follows:

(1) In a TDD system, radio frame duration is unchanged, duration of each subframe is also unchanged, and one subframe includes 14 symbols. A TTI is equal to the subframe duration. In radio frame configuration, at least one of not less than two consecutive downlink subframes of one radio frame is configured as a first subframe, that is, as shown in Table 2, a group of DL switch points are added to each radio frame. This reduces a time interval for waiting for UL/DL switching in some subframes, thereby reducing a system RTT. In Table 2, "X" represents the first subframe.

TABLE 2

| TDD configuration | Downlink-to-uplink switch-point period | Subframe number | | | | | | | | | |
|---|---|---|---|---|---|---|---|---|---|---|---|
| | | 0 | 1 | 2 | 3 | 4 | 5 | 6 | 7 | 8 | 9 |
| 7 (originally 2) | 5 ms | D | S | U | D | X | D | S | U | D | D |
| 8 (originally 3) | 10 ms | D | S | U | U | U | D | D | X | D | D |
| 9 (originally 4) | 10 ms | D | S | U | U | D | D | X | D | D | D |
| 10 (originally 5) | 10 ms | D | S | U | D | D | D | D | X | D | D |

Figure 3:
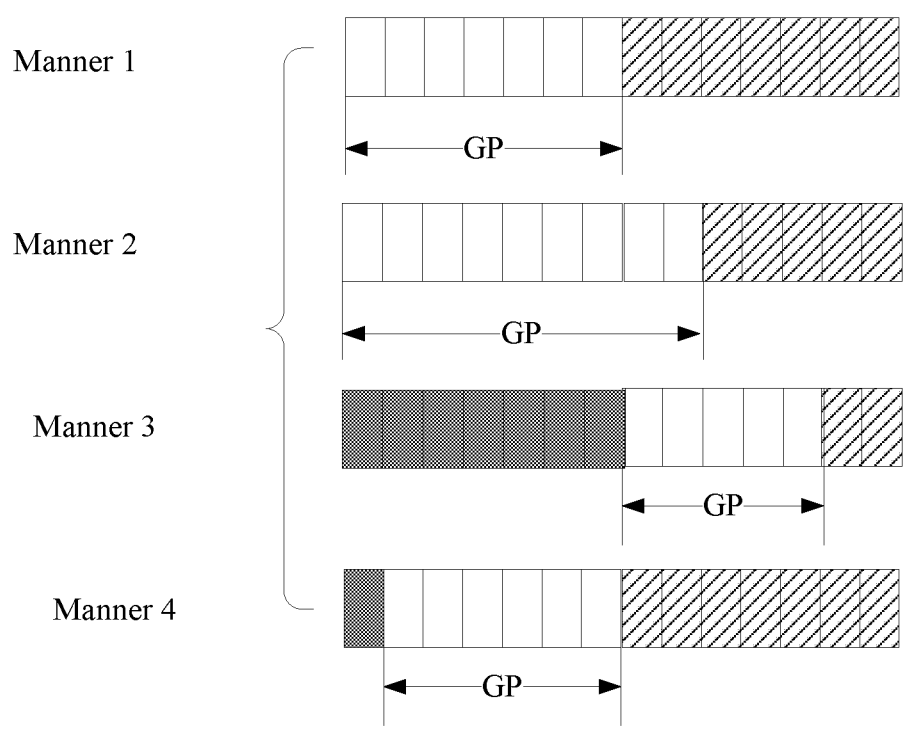
FIG. 3 is a schematic structural diagram of a first subframe according to an embodiment of the present invention.

The first subframe may be configured in, but not limited to, the following manners, as shown in FIG. 3 (the figure shows merely an example and does not impose any specific limitation on the solutions provided in the embodiments of the present invention):

Manner 1: The first seven symbols in the first subframe are a guard period, and the last seven symbols are an uplink pilot timeslot used for uplink service transmission.

Manner 2: The first x symbols in the first subframe are a guard period, and the last y symbols are an uplink pilot timeslot used for uplink service transmission, where 14=x+y, and x>7.

Manner 3: The first x symbols in the first subframe are a downlink pilot timeslot used for downlink service transmission, the last y symbols are an uplink pilot timeslot used for uplink service transmission, and the middle z symbols are a guard period, where 14=x+y+z, and x≤7.

Manner 4: The first x symbols in the first subframe are a downlink pilot timeslot used for downlink service transmission, the last y symbols are an uplink pilot timeslot used for uplink service transmission, and the middle z symbols are a guard period, where 14=x+y+z, x<7, and y=7.

Figure 4:
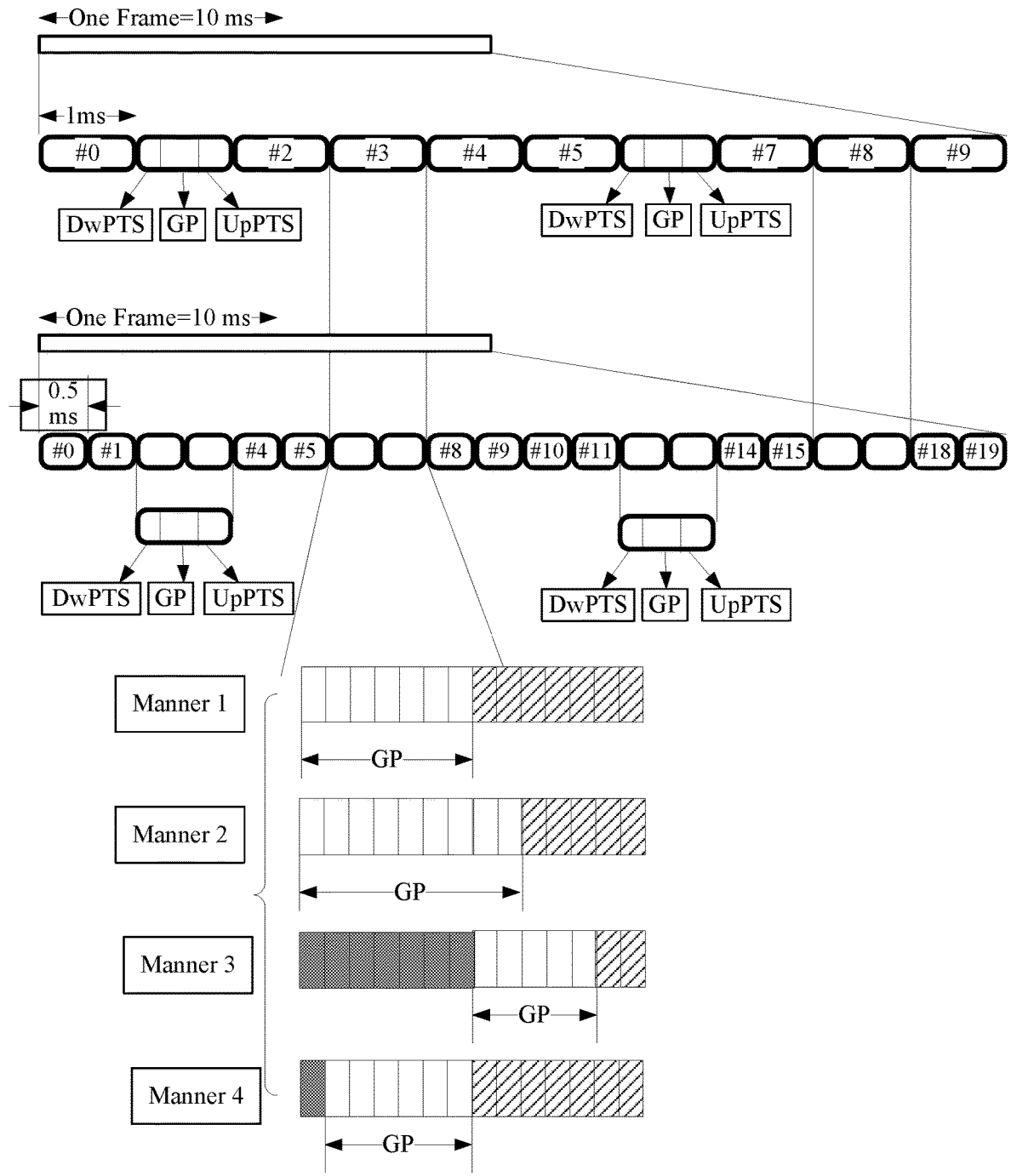
FIG. 4 is a schematic structural diagram of another TDD subframe according to an embodiment of the present invention.

Optionally, by means of the configuration described above, the radio frame duration is kept unchanged and is still 10 ms, and the subframe duration is reduced to 1/n of the original subframe duration, where n>1, and n is a positive integer. The subframe may be evenly divided into n parts, and a use of a symbol that occupies each part is unchanged. The TTI is equal to the subframe duration. For example, n=2. In this case, after a change, an uplink subframe becomes two uplink subframes, and a downlink subframe becomes two downlink subframes. Based on the foregoing Manner 1 in which the first subframe is configured, the first seven symbols are duration of one subframe and are altogether used as a guard period, and the last seven symbols are an uplink pilot timeslot and used as one subframe that may be considered as an uplink subframe. The other manners are shown in FIG. 4.

Optionally, the radio frame duration may be unchanged and still be 10 ms, and the subframe duration may be unchanged. The transmission time interval TTI is shortened. For example, a shortened TTI is 0.5 ms. For example, in Manner 4, for the configured first subframe, the first few symbols in a current TTI are used for downlink service transmission, and a next TTI is used as an uplink subframe for uplink service transmission.

(2) Generally, in a TDD system, radio frame duration is unchanged and is still 10 ms, and subframe duration may be reduced to 1/n of the original subframe duration, where n>1, and n is optionally an integer. Based on reduction of the subframe duration, at least one of not less than two consecutive downlink subframes may be configured as the first subframe.

The configured first subframe includes a guard period and at least one first symbol used for uplink service transmission, and the guard period precedes the first symbol.

Specifically, the first subframe includes C symbols, where the first x symbols are the guard period, the last y symbols are an uplink pilot timeslot used for uplink service transmission, x=C/2, and y=C/2; or the first subframe includes C symbols, where the first x symbols are the guard period, the last y symbols are an uplink pilot timeslot used for uplink service transmission, C=x+y, and x>C/2.

Further, the configured first subframe further includes at least one second symbol used for downlink service transmission, and the second symbol precedes the guard period.

Specifically, the first subframe includes C symbols, where the first x symbols are a downlink pilot timeslot used for downlink service transmission, the last y symbols are an uplink pilot timeslot used for uplink service transmission, the middle z symbols are the guard period, C=x+y+z, and x≤C/2; or the first subframe includes C symbols, where the first x symbols are a downlink pilot timeslot used for downlink service transmission, the last y symbols are an uplink pilot timeslot used for uplink service transmission, the middle z symbols are the guard period, C=x+y+z, x<C/2, and y=C/2.

For example, n=2. In this case, subframe duration is 0.5 ms. A TTI length is equal to the subframe duration, that is, 0.5 ms. A symbol length is the same as that in an existing TDD LTE system.

In the present invention, subframes are numbered in a numbering manner that is the same as that in an existing TDD system. That is, in one radio frame, subframes are numbered from 0. In one radio frame, the first subframe is a subframe 0, the second subframe is a subframe 1, and so on. Explanation is not repeated hereinafter.

When n=2, there may be multiple TDD configuration manners. The following describes one of the TDD configuration manners by using an example. Because there are multiple possible TDD configuration manners, the manners cannot be listed one by one. For example, TDD configuration manners are shown in Table 3.

Optionally, the first subframe may further occupy locations of two shortened subframes.

For example, the first subframe includes C symbols, where the first x symbols are a downlink pilot timeslot used for downlink service transmission, the last y symbols are an uplink pilot timeslot used for uplink service transmission, the middle z symbols are the guard period, $C=x+y+z$, $x<C/2$, and $y=C/2$. In this case, it is determined that $C=14$. A current

TABLE 3

| TDD configuration | Downlink-to-uplink switch-point period | Subframe number | | | | | | | | | | | | | | | | | | | |
|---|---|---|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 | 16 | 17 | 18 | 19 |
| 7 (originally 0) | 5 ms | D | D | S | S | U | U | U | U | U | D | D | D | S | S | U | U | U | U | U | U |
| 8 (originally 1) | 5 ms | D | D | S | S | U | U | U | U | D | D | D | D | S | S | U | U | U | U | D | D |
| 9 (originally 2) | 5 ms | D | D | S | S | U | U | D | D | D | D | D | D | S | S | U | U | D | D | D | D |
| 10 (originally 3) | 10 ms | D | D | S | S | U | U | U | U | U | U | D | D | D | D | D | D | D | D | D | D |
| 11 (originally 4) | 10 ms | D | D | S | S | U | U | U | U | D | D | D | D | D | D | D | D | D | D | D | D |
| 12 (originally 5) | 10 ms | D | D | S | S | U | U | D | D | D | D | D | D | D | D | D | D | D | D | D | D |
| 13 (originally 6) | 5 ms | D | D | S | S | U | U | U | U | U | D | D | D | S | S | U | U | U | U | D | D |

It should be noted that, in TDD configurations in all tables below, a correspondence between a subframe configuration in which a TTI is less than 1 ms and an original subframe is the same as the correspondence in Table 3, and explanation is not repeated unless for a special case.

Compared with the TDD configuration of the existing TDD LTE system in Table 1, it can be seen that, in Table 3, a downlink-to-uplink switch-point period does not change, and one original subframe is changed into two same consecutive subframes.

In actual implementation, with different coverage scenarios taken into consideration, duration of an S subframe in Table 3 may be modified. For example, for a small-coverage scenario (that is, a cell coverage radius is not greater than a preset coverage radius threshold), only a subframe 2 may be set as an S subframe, and a subframe 3 may be set as an uplink subframe. In a radio frame of 10 ms, a subframe 2 and a subframe 12 are S subframes, and a subframe 3 and a subframe 13 are changed into uplink subframes. For a large-coverage scenario (that is, a cell coverage radius is greater than a preset coverage radius threshold), because a relatively large GP length is required, multiple consecutive subframes may need to be occupied as an S subframe. For example, the configuration manner in Table 3 may be used, and two consecutive subframes are occupied as the S subframe.

On the foregoing basis, at least one of not less than two consecutive downlink subframes is configured as a first subframe.

For example, refer to Table 4.

TTI is used for downlink service transmission, including UL data scheduling. A next TTI is used for uplink service transmission, for example, UL data sending or UL feedback for DL data.

In the foregoing scenario, a corresponding TDD HARQ time sequence needs to be redesigned.

The following first describes a UL HARQ time sequence.

A time sequence for sending UL data is as follows:

Step 1: Send UL scheduling information in a DL subframe (subframe duration herein is 0.5 ms) n, where the information includes UL grant information. It is assumed that a sending time is a TTI n.

Step 2: After receiving a UL grant, UE sends UL data in a TTI n+k, where k is greater than or equal to four TTIs, and the subframe n+k is a UL subframe. For example, a value of k is shown in Table 5 (value settings of k are described by using the subframe configuration in Table 4 as an example).

TABLE 4

| TDD configuration | Downlink-to-uplink switch-point period | Subframe number | | | | | | | | | | | | | | | | | | | |
|---|---|---|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 | 16 | 17 | 18 | 19 |
| 9 | 5 ms | D | D | S | U | U | U | D | D | X | D | D | D | S | U | U | D | D | S | U |
| 10 | 10 ms | D | D | S | U | U | U | U | U | U | D | D | D | D | X | D | D | D | D | D |
| 11 | 10 ms | D | D | S | U | U | U | U | U | D | D | D | D | D | X | D | D | D | D | D |
| 12 | 10 ms | D | D | S | U | U | U | D | D | D | D | D | D | D | X | D | D | D | D | D |

TABLE 5

| TDD configuration | Downlink-to-uplink switch-point period | Subframe number | | | | | | | | | | | | | | | | | | | |
|---|---|---|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 | 16 | 17 | 18 | 19 |
| 9 | 5 ms | 4 | 4 | 7 | — | — | — | — | 6 | — | — | 4 | 4 | 7 | — | — | — | — | 6 | — | — |

Step 3: An eNB sends a DL feedback for the UL data in a subframe n+k+k1, where k1 is greater than or equal to four TTIs, and the subframe n+k+k1 is a DL subframe. For example, a value of k1 is shown in Table 6 (value settings of k1 are described by using the subframe configuration in Table 4 as an example).

TABLE 6

| TDD configuration | Downlink-to-uplink switch-point period | Subframe number | | | | | | | | | | | | | | | | | | | |
|---|---|---|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 | 16 | 17 | 18 | 19 |
| 9 | 5 ms | — | — | — | 7 | 7 | 7 | — | — | — | 9 | — | — | — | 5 | 7 | 7 | — | — | — | 8 |

Step 4: If the eNB feeds back an NACK in the subframe n+k+k1, the UE performs retransmission in a subframe n+k+k1+k.

DL HARQ Time Sequence

A time sequence for sending DL data is as follows:

Step 1: An eNB sends DL data to UE in a subframe n, where the subframe n is a DL subframe.

Step 2: The UE sends a UL feedback to the eNB in a subframe n+k2, where k2 is greater than or equal to four subframes, and the n+k2 is a UL subframe. A value of k2 is shown in Table 7 (value settings of k2 are described by using the subframe configuration in Table 4 as an example).

TABLE 7

| TDD configuration | Downlink-to-uplink switch-point period | Subframe number | | | | | | | | | | | | | | | | | | | |
|---|---|---|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 | 16 | 17 | 18 | 19 |
| 9 | 5 ms | 5 | 8 | — | — | — | — | 7 | 7 | — | — | 5 | 8 | — | — | — | — | 7 | 7 | — | — |

TABLE 8

| TDD configuration | Downlink-to-uplink switch-point period | Subframe number | | | | | | | | | |
|---|---|---|---|---|---|---|---|---|---|---|---|
| | | 0 | 1 | 2 | 3 | 4 | 5 | 6 | 7 | 8 | 9 |
| 7 (originally 0) | 5 ms | D | S | U | E | U | D | S | U | U | U |
| 13 (originally 6) | 10 ms | D | S | U | E | U | D | S | U | U | D |

For a case in which the radio frame configuration information is used to instruct the UE to set at least one of M consecutive uplink subframes of one radio frame as a second subframe, specific descriptions are provided as follows:

(1) In a TDD system, radio frame duration is unchanged, duration of each subframe is also unchanged, and one subframe includes 14 symbols. A TTI is equal to the subframe duration. In radio frame configuration, at least one of not less than two consecutive uplink subframes of one radio frame is configured as a second subframe. That is, as shown in Table 8, a TTI is equal to, for example, 1 ms, and the TTI length is equal to subframe duration, and a group of DL switch points are added to each radio frame. This reduces a time interval for waiting for UL/DL switching in some subframes, thereby reducing a system RTT. In Table 8, "E" represents the second subframe.

Figure 5:
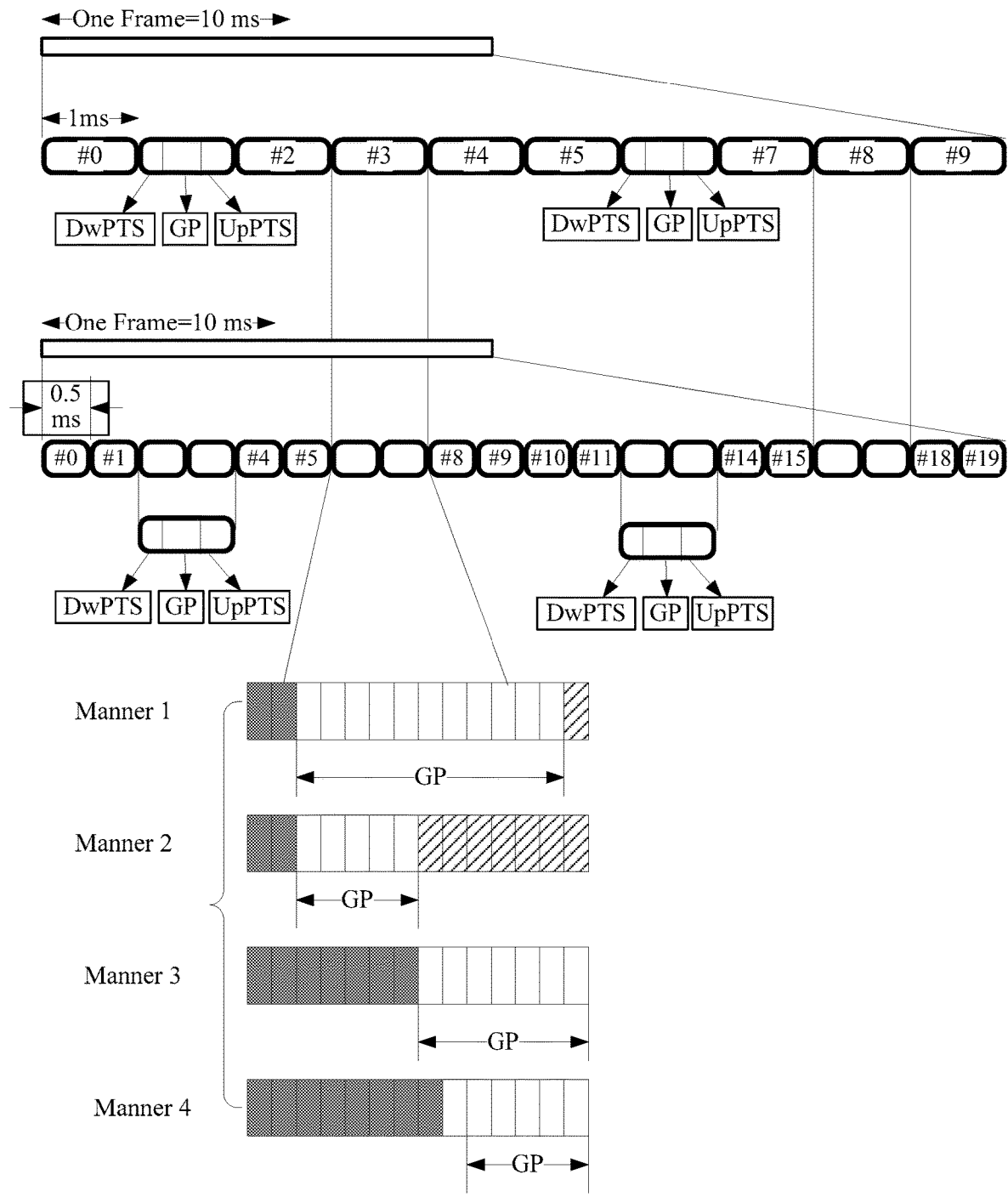
FIG. 5 is a schematic structural diagram of still another TDD subframe according to an embodiment of the present invention.

Optionally, the second subframe may be configured in, but not limited to, the following manners, as shown in FIG. 5 (the figure shows merely an example and does not impose any specific limitation on the solutions provided in the embodiments of the present invention):

(1) The second subframe includes P symbols, where the first a symbols are a downlink pilot timeslot, the last b symbols are an uplink pilot timeslot, the middle w symbols are a guard period, P=a+b+w, and a≤P/2.

(2) The second subframe includes P symbols, where the first a symbols are a downlink pilot timeslot, the last b symbols are an uplink pilot timeslot, the middle w symbols are a guard period, P=a+b+w, a<P/2, and b=P/2.

(3) The second subframe includes P symbols, where the first a symbols are a downlink pilot timeslot, the last b symbols are a guard period, a=P/2, and b=P/2.

(4) The second subframe includes P symbols, where the first a symbols are a downlink pilot timeslot, the last b symbols are a guard period, P=a+b, and a>P/2.

Herein, P=14.

Optionally, by means of the configuration described above, the radio frame duration is kept unchanged and is still 10 ms, and the subframe duration is reduced to 1/n of the original subframe duration, where n>1, and n is a positive integer. The subframe may be evenly divided into n parts, and a use of a symbol that occupies each part is unchanged. The TTI is equal to the subframe duration. For example, n=2. In this case, after a change, an uplink subframe becomes two uplink subframes, and a downlink subframe becomes two downlink subframes. Based on the foregoing third manner in which the second subframe is configured, the first seven symbols are a downlink pilot timeslot and used as one subframe that may be considered as a downlink subframe, and the last seven symbols are duration of one subframe and are altogether used as a guard period. The other manners are shown in FIG. 5.

Optionally, the radio frame duration may be unchanged and still be 10 ms, and the subframe duration may be unchanged. The transmission time interval TTI is shortened. For example, a shortened TTI is 0.5 ms. For example, in the second manner, for the configured second subframe, the first few symbols in a current TTI are used for downlink service transmission, and a next TTI may be considered as an uplink subframe and is used for uplink service transmission.

(2) Generally, in a TDD system, radio frame duration is unchanged and is still 10 ms, and subframe duration may be reduced to 1/n of the original subframe duration, where n>1, and n is optionally an integer.

Based on reduction of the subframe duration, at least one of not less than two consecutive downlink subframes may be configured as the second subframe.

Optionally, the second subframe includes a guard period and at least one third symbol used for downlink service transmission, and the guard period is preceded by the third symbol.

Specifically, the second subframe includes P symbols, where the first a symbols are a downlink pilot timeslot used for downlink service transmission, the last b symbols are the guard period, a=P/2, and b=P/2; or the second subframe includes P symbols, where the first a symbols are a downlink pilot timeslot used for downlink service transmission, the last b symbols are the guard period, P=a+b, and a>P/2.

Further, the second subframe further includes at least one fourth symbol used for uplink service transmission, and the fourth symbol is preceded by the guard period.

Specifically, the second subframe includes P symbols, where the first a symbols are a downlink pilot timeslot used for downlink service transmission, the last b symbols are an uplink pilot timeslot used for uplink service transmission, the middle w symbols are the guard period, P=a+b+w, and a≤P/2; or the second subframe includes P symbols, where the first a symbols are a downlink pilot timeslot used for downlink service transmission, the last b symbols are an uplink pilot timeslot used for uplink service transmission, the middle w symbols are the guard period, P=a+b+w, a<P/2, and b=P/2.

For example, n=2. In this case, subframe duration is 0.5 ms. A TTI length is equal to the subframe duration, that is, 0.5 ms. A symbol length is the same as that in an existing TDD LTE system.

When n=2, there may be multiple TDD configuration manners. The following describes one of the TDD configuration manners by using an example. Because there are multiple possible TDD configuration manners, the manners cannot be listed one by one. For example, TDD configuration manners are shown in Table 3.

Compared with the TDD configuration of the existing TDD LTE system in Table 1, it can be seen that, in Table 3, a downlink-to-uplink switch-point period does not change, and one original subframe is changed into two same consecutive subframes.

In actual implementation, with different coverage scenarios taken into consideration, duration of an S subframe in Table 3 may be modified. For example, for a small-coverage scenario (that is, a cell coverage radius is not greater than a preset coverage radius threshold), only a subframe 2 may be set as an S subframe, and a subframe 3 may be set as an uplink subframe. In a radio frame of 10 ms, a subframe 2 and a subframe 12 are S subframes, and a subframe 3 and a subframe 13 are changed into uplink subframes.

For a large-coverage scenario (that is, a cell coverage radius is greater than a preset coverage radius threshold), because a relatively large GP length is required, multiple consecutive subframes may need to be occupied as an S subframe. For example, the configuration manner in Table 3 may be used, and two consecutive subframes are occupied as the S subframe.

Based on this, at least one of not less than two consecutive uplink subframes may be configured as a second subframe for downlink service transmission or for downlink service transmission and uplink service transmission. A group of DL switch points are added to each radio frame. This reduces a time interval for waiting for UL/DL switching in some subframes, thereby reducing a system RTT.

For example, refer to Table 9.

TABLE 9

| TDD configuration | Downlink-to-uplink switch-point period | Subframe number | | | | | | | | | | | | | | | | | | |
|---|---|---|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 | 16 | 17 | 18 | 19 |
| 7 | 5 ms | D | D | S | U | U | U | E | U | U | U | D | D | S | U | U | U | R | U | U | U |
| 13 | 5 ms | D | D | S | U | U | U | E | U | U | U | D | D | S | U | U | U | U | U | D | D |

Optionally, the second subframe may further occupy locations of two shortened subframes, and the TTI is equal to 0.5 ms.

Manner 1: The second subframe includes P symbols, where the first a symbols are a downlink pilot timeslot used for downlink service transmission, the last b symbols are the guard period, a=P/2, and b=P/2.

Specifically, a current TTI is used as a DL subframe for sending (both a DL grant and DL data) or for sending a UL grant, and a next TTI is used as the GP.

Manner 2: The second subframe includes P symbols, where the first a symbols are a downlink pilot timeslot used for downlink service transmission, the last b symbols are the guard period, P=a+b, and a>P/2.

Specifically, a current TTI is used for DL data and a DL grant/a UL grant. The first few symbols in a next TTI are used only for a PDCCH. The GP is used for DL-to-UL switching.

Manner 3: The second subframe includes P symbols, where the first a symbols are a downlink pilot timeslot used for downlink service transmission, the last b symbols are an uplink pilot timeslot used for uplink service transmission, the middle w symbols are the guard period, P=a+b+w, and a≤P/2.

Specifically, the first few symbols in a current TTI are used for downlink service transmission, and the last few symbols of a next TTI are used for uplink service transmission.

Manner 4: The second subframe includes P symbols, where the first a symbols are a downlink pilot timeslot used for downlink service transmission, the last b symbols are an uplink pilot timeslot used for uplink service transmission, the middle w symbols are the guard period, P=a+b+w, a<P/2, and b=P/2.

Specifically, a PDCCH symbol that occupies several symbols exists in the current TTI (0.5 ms) and is used for sending a UL grant, the GP that occupies several symbols exists in the middle, and a timeslot of the next TTI (0.5 ms) is used as a hold UL subframe for sending UL data.

Specifically, a GP length may be determined according to a cell coverage radius. If the cell coverage radius is greater than a preset coverage radius threshold, the special subframe may be configured in Manner 1. If the cell coverage radius is less than a preset coverage radius threshold, the special subframe may be configured in any one of Manner 2 to Manner 4.

Optionally, that the base station communicates with the UE by using a radio frame configured according to the radio frame configuration information may be specifically receiving, by using the uplink pilot timeslot in the second subframe, uplink control information and/or uplink data sent by the UE. The uplink control information includes at least one of uplink reply information, uplink scheduling information, or channel state information.

Optionally, the base station is further configured to determine a time sequence of an HARQ process for performing data transmission with the UE, and perform data transmission with the UE in the determined time sequence of the HARQ process.

In the foregoing scenario, a corresponding TDD HARQ time sequence needs to be redesigned.

The following first describes a UL HARQ time sequence.

A time sequence for sending UL data is as follows:

Step 1: Send UL scheduling information in a DL subframe (subframe duration herein is 0.5 ms) n, where the information includes UL grant information. It is assumed that a sending time is a TTI n.

Step 2: After receiving a UL grant, UE sends UL data in a TTI n+k, where k is greater than or equal to four TTIs, and the subframe n+k is a UL subframe. For example, a value of k is shown in Table 10 (value settings of k are described by using the subframe configuration in Table 9 as an example).

TABLE 10

| TDD configuration | Downlink-to-uplink switch-point period | Subframe number |||||||||||||||||||| 
|---|---|---|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 | 16 | 17 | 18 | 19 |
| 7 | 5 ms | 5 | 7 | 7 | — | — | — | 7 | 7 | — | — | 5 | 7 | 7 | — | — | — | 7 | 7 | — | — |

Step 3: An eNB sends a DL feedback for the UL data in a subframe n+k+k1, where k1 is greater than or equal to four TTIs, and the subframe n+k+k1 is a DL subframe. For example, a value of k1 is shown in Table 11 (value settings of k1 are described by using the subframe configuration in Table 9 as an example).

TABLE 11

| TDD configuration | Downlink-to-uplink switch-point period | Subframe number |||||||||||||||||||| 
|---|---|---|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 | 16 | 17 | 18 | 19 |
| 7 | 5 ms | — | — | — | 4 | 6 | 6 | — | — | 4 | 7 | — | — | — | 4 | 6 | 6 | — | — | 4 | 7 |

Step 4: If the eNB feeds back an NACK in the subframe n+k+k1, the UE performs retransmission in a subframe n+k+k1+k.

The following describes a DL HARQ time sequence.

A time sequence for sending DL data is as follows:

Step 1: An eNB sends DL data to UE in a subframe n, where the subframe n is a DL subframe.

Step 2: The UE sends a UL feedback to the eNB in a subframe n+k2, where k2 is greater than or equal to four subframes, and the n+k2 is a UL subframe. A value of k2 is shown in Table 12 (value settings of k2 are described by using the subframe configuration in Table 9 as an example).

TABLE 12

| TDD configuration | Downlink-to-uplink switch-point period | Subframe number | | | | | | | | | | | | | | | | | | |
|---|---|---|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 | 16 | 17 | 18 | 19 |
| 7 | 5 ms | 4 | 4 | — | — | — | — | 7 | — | — | — | 4 | 4 | — | — | — | — | 7 | — | — | — |
| 13 | 10 ms | 4 | 4 | — | — | — | — | 7 | — | — | — | 4 | 4 | — | — | — | — | 7 | — | — | — |

Figure 6:
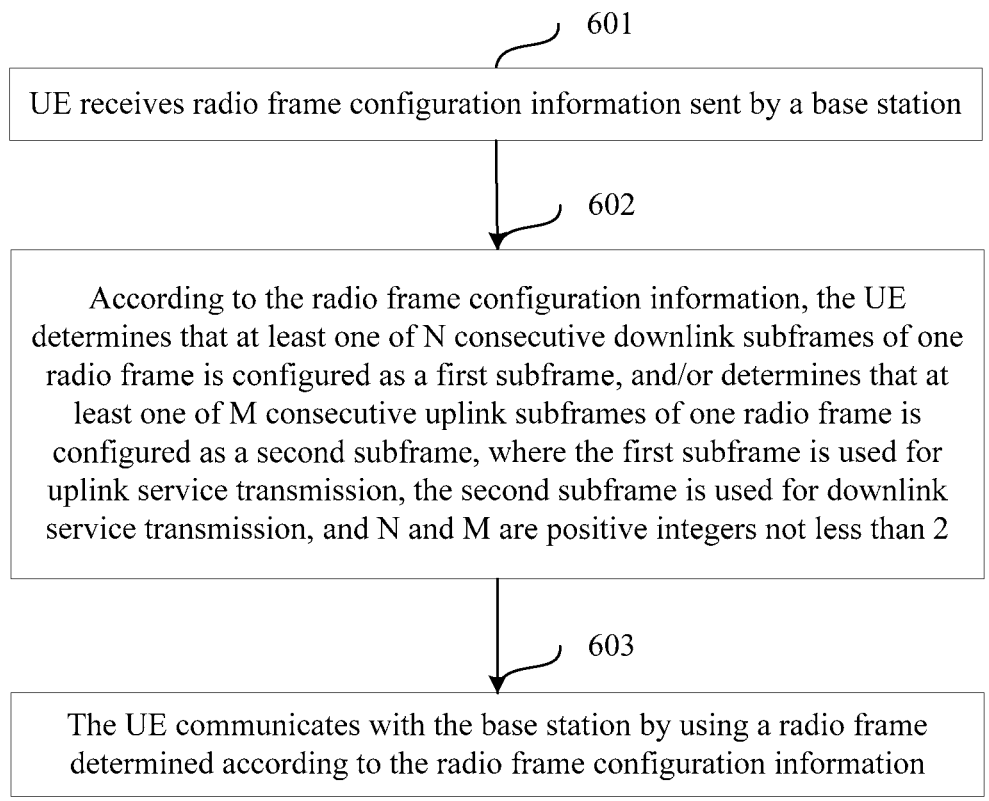
FIG. 6 is a flowchart of another communication method in a time division duplex system according to an embodiment of the present invention.

Based on an invention idea the same as that of the embodiment shown in FIG. 2, an embodiment of the present invention further provides another communication method in a time division duplex system. Content the same as that of the embodiment shown in FIG. 2 is not repeated herein. As shown in FIG. 6, the method includes the following steps:

Step 601: UE receives radio frame configuration information sent by a base station.

Step 602: According to the radio frame configuration information, the UE determines that at least one of N consecutive downlink subframes of one radio frame is configured as a first subframe, and/or determines that at least one of M consecutive uplink subframes of one radio frame is configured as a second subframe, where the first subframe is used for uplink service transmission, the second subframe is used for downlink service transmission, and N and M are positive integers not less than 2.

Step 603: The UE communicates with the base station by using a radio frame determined according to the radio frame configuration information.

According to the method provided in the foregoing embodiment, after UE receives, in a downlink subframe, downlink data sent by a base station, the UE needs to send feedback information of downlink-data reception to the base station in a subsequent uplink subframe. According to the method provided in the present invention, after UE receives, in a downlink subframe, downlink data sent by a base station, because at least one of at least two consecutive downlink subframes is configured as a first subframe, the UE can send feedback information of downlink-data reception to the base station in the first subframe, instead of waiting until a subsequent uplink subframe to send the feedback information of downlink-data reception to the base station. Alternatively, after UE sends uplink data to a base station in an uplink subframe, because at least one of at least two consecutive uplink subframes is configured as a second subframe, the UE can receive feedback information from the base station in the second subframe, instead of waiting until a subsequent downlink subframe to receive the feedback information from the base station. In this way, a time interval for waiting for UL/DL switching is shortened, and a system RTT is shortened.

Optionally, the first subframe includes a guard period and at least one first symbol used for uplink service transmission, and the guard period precedes the first symbol.

Specifically, the first subframe includes C symbols, where the first x symbols are the guard period, the last y symbols are an uplink pilot timeslot used for uplink service transmission, $x=C/2$, and $y=C/2$; or the first subframe includes C symbols, where the first x symbols are the guard period, the last y symbols are an uplink pilot timeslot used for uplink service transmission, $C=x+y$, and $x>C/2$.

Further, the first subframe further includes at least one second symbol used for downlink service transmission, and the second symbol precedes the guard period.

Specifically, the first subframe includes C symbols, where the first x symbols are a downlink pilot timeslot used for downlink service transmission, the last y symbols are an uplink pilot timeslot used for uplink service transmission, the middle z symbols are the guard period, $C=x+y+z$, and $x \leq C/2$; or the first subframe includes C symbols, where the first x symbols are a downlink pilot timeslot used for downlink service transmission, the last y symbols are an uplink pilot timeslot used for uplink service transmission, the middle z symbols are the guard period, $C=x+y+z$, $x<C/2$, and $y=C/2$.

Optionally, the second subframe includes a guard period and at least one third symbol used for downlink service transmission, and the guard period is preceded by the third symbol.

Specifically, the second subframe includes P symbols, where the first a symbols are a downlink pilot timeslot used for downlink service transmission, the last b symbols are the guard period, $a=P/2$, and $b=P/2$; or the second subframe includes P symbols, where the first a symbols are a downlink pilot timeslot used for downlink service transmission, the last b symbols are the guard period, $P=a+b$, and $a>P/2$.

Further, the second subframe further includes at least one fourth symbol used for uplink service transmission, and the fourth symbol is preceded by the guard period.

Specifically, the second subframe includes P symbols, where the first a symbols are a downlink pilot timeslot used for downlink service transmission, the last b symbols are an uplink pilot timeslot used for uplink service transmission, the middle w symbols are the guard period, $P=a+b+w$, and $a \leq P/2$; or the second subframe includes P symbols, where the first a symbols are a downlink pilot timeslot used for downlink service transmission, the last b symbols are an uplink pilot timeslot used for uplink service transmission, the middle w symbols are the guard period, $P=a+b+w$, $a<P/2$, and $b=P/2$.

Figure 7:
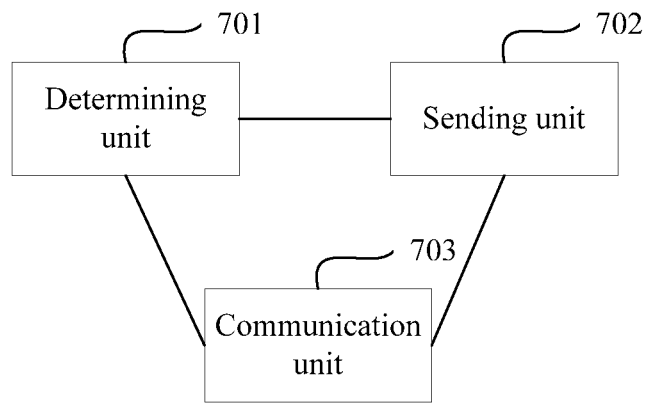
FIG. 7 is a schematic structural diagram of a base station according to an embodiment of the present invention.

An embodiment of the present invention further provides a base station. As shown in FIG. 7, the base station includes:

a determining unit 701, configured to determine radio frame configuration information;

a sending unit 702, configured to send the radio frame configuration information determined by the determining unit 701 to user equipment UE, where the radio frame configuration information is used to instruct the UE to set at least one of N consecutive downlink subframes of one radio frame as a first subframe, and/or the radio frame configuration information is used to instruct the UE to set at least one of M consecutive uplink subframes of one radio frame as a second subframe, where the first subframe is used for uplink service transmission, the second subframe is used for downlink service transmission, and N and M are positive integers not less than 2; and a communication unit 703, configured to communicate with the UE by using a radio frame configured according to the radio frame configuration information.

Optionally, the first subframe includes a guard period and at least one first symbol used for uplink service transmission, and the guard period precedes the first symbol.

Specifically, the first subframe includes C symbols, where the first x symbols are the guard period, the last y symbols are an uplink pilot timeslot used for uplink service transmission, x=C/2, and y=C/2; or the first subframe includes C symbols, where the first x symbols are the guard period, the last y symbols are an uplink pilot timeslot used for uplink service transmission, C=x+y, and x>C/2.

Further, the first subframe further includes at least one second symbol used for downlink service transmission, and the second symbol precedes the guard period.

Specifically, the first subframe includes C symbols, where the first x symbols are a downlink pilot timeslot used for downlink service transmission, the last y symbols are an uplink pilot timeslot used for uplink service transmission, the middle z symbols are the guard period, C=x+y+z, and x≤C/2; or the first subframe includes C symbols, where the first x symbols are a downlink pilot timeslot used for downlink service transmission, the last y symbols are an uplink pilot timeslot used for uplink service transmission, the middle z symbols are the guard period, C=x+y+z, x<C/2, and y=C/2.

Optionally, the second subframe includes a guard period and at least one third symbol used for downlink service transmission, and the guard period is preceded by the third symbol.

Specifically, the second subframe includes P symbols, where the first a symbols are a downlink pilot timeslot used for downlink service transmission, the last b symbols are the guard period, a=P/2, and b=P/2; or the second subframe includes P symbols, where the first a symbols are a downlink pilot timeslot used for downlink service transmission, the last b symbols are the guard period, P=a+b, and a>P/2.

Optionally, the second subframe further includes at least one fourth symbol used for uplink service transmission, and the fourth symbol is preceded by the guard period.

Specifically, the second subframe includes P symbols, where the first a symbols are a downlink pilot timeslot used for downlink service transmission, the last b symbols are an uplink pilot timeslot used for uplink service transmission, the middle w symbols are the guard period, P=a+b+w, and a≤P/2; or the second subframe includes P symbols, where the first a symbols are a downlink pilot timeslot used for downlink service transmission, the last b symbols are an uplink pilot timeslot used for uplink service transmission, the middle w symbols are the guard period, P=a+b+w, a<P/2, and b=P/2.

Optionally, the sending unit 702 is specifically configured to:

send, for the base station, the radio frame configuration information to the UE by using a broadcast message; or send, for the base station, the radio frame configuration information to the UE by using radio resource control RRC dedicated signaling, Media Access Control MAC signaling, or physical downlink control channel PDCCH signaling.

Figure 8:
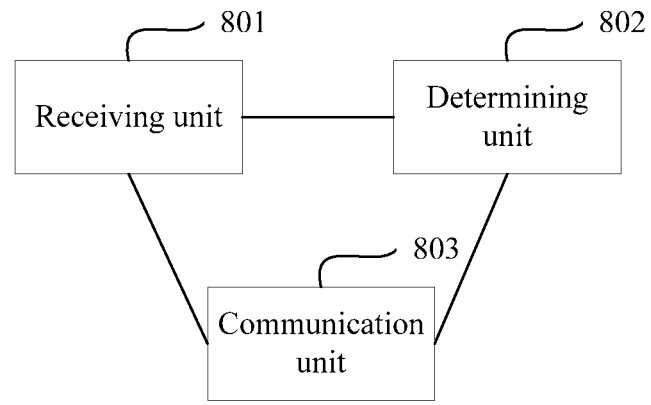
FIG. 8 is a schematic structural diagram of user equipment according to an embodiment of the present invention.

An embodiment of the present invention provides user equipment. As shown in FIG. 8, the user equipment includes:

a receiving unit 801, configured to receive radio frame configuration information sent by a base station;

a determining unit 802, configured to: according to the radio frame configuration information, determine that at least one of N consecutive downlink subframes of one radio frame is configured as a first subframe, and/or determine that at least one of M consecutive uplink subframes of one radio frame is configured as a second subframe, where the first subframe is used for uplink service transmission, the second subframe is used for downlink service transmission, and N and M are positive integers not less than 2; and a communication unit 803, configured to communicate with the base station by using a radio frame determined according to the radio frame configuration information.

Optionally, the first subframe includes a guard period and at least one first symbol used for uplink service transmission, and the guard period precedes the first symbol.

Specifically, the first subframe includes C symbols, where the first x symbols are the guard period, the last y symbols are an uplink pilot timeslot used for uplink service transmission, x=C/2, and y=C/2; or the first subframe includes C symbols, where the first x symbols are the guard period, the last y symbols are an uplink pilot timeslot used for uplink service transmission, C=x+y, and x>C/2.

Further, the first subframe further includes at least one second symbol used for downlink service transmission, and the second symbol precedes the guard period.

Specifically, the first subframe includes C symbols, where the first x symbols are a downlink pilot timeslot used for downlink service transmission, the last y symbols are an uplink pilot timeslot used for uplink service transmission, the middle z symbols are the guard period, C=x+y+z, and x≤C/2; or the first subframe includes C symbols, where the first x symbols are a downlink pilot timeslot used for downlink service transmission, the last y symbols are an uplink pilot timeslot used for uplink service transmission, the middle z symbols are the guard period, C=x+y+z, x<C/2, and y=C/2.

Optionally, the second subframe includes a guard period and at least one third symbol used for downlink service transmission, and the guard period is preceded by the third symbol.

Specifically, the second subframe includes P symbols, where the first a symbols are a downlink pilot timeslot used for downlink service transmission, the last b symbols are the guard period, a=P/2, and b=P/2; or the second subframe includes P symbols, where the first a symbols are a downlink pilot timeslot used for downlink service transmission, the last b symbols are the guard period, P=a+b, and a>P/2.

Further, the second subframe further includes at least one fourth symbol used for uplink service transmission, and the fourth symbol is preceded by the guard period.

Specifically, the second subframe includes P symbols, where the first a symbols are a downlink pilot timeslot used for downlink service transmission, the last b symbols are an uplink pilot timeslot used for uplink service transmission, the middle w symbols are the guard period, P=a+b+w, and a≤P/2; or the second subframe includes P symbols, where the first a symbols are a downlink pilot timeslot used for downlink service transmission, the last b symbols are an uplink pilot timeslot used for uplink service transmission, the middle w symbols are the guard period, P=a+b+w, a<P/2, and b=P/2.

It should be noted that unit division in the embodiments of the present invention is an example and is merely a logical function division. In actual implementation, there may be another division manner, or some features may be ignored or may not be performed. In addition, functional units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the prior art, or all or a part of the technical solutions may be implemented in a form of a software product. The computer software product is stored in a storage medium and includes several instructions for instructing a computer device (which may be a personal computer, a server, a network device, or the like) or a processor (processor) to perform all or a part of the steps of the methods in the embodiments of this application. The foregoing storage medium includes any medium that can store program code, such as a USB flash drive, a removable hard disk, a read-only memory (ROM), a random access memory (RAM), a magnetic disk, or an optical disc.

Figure 9:
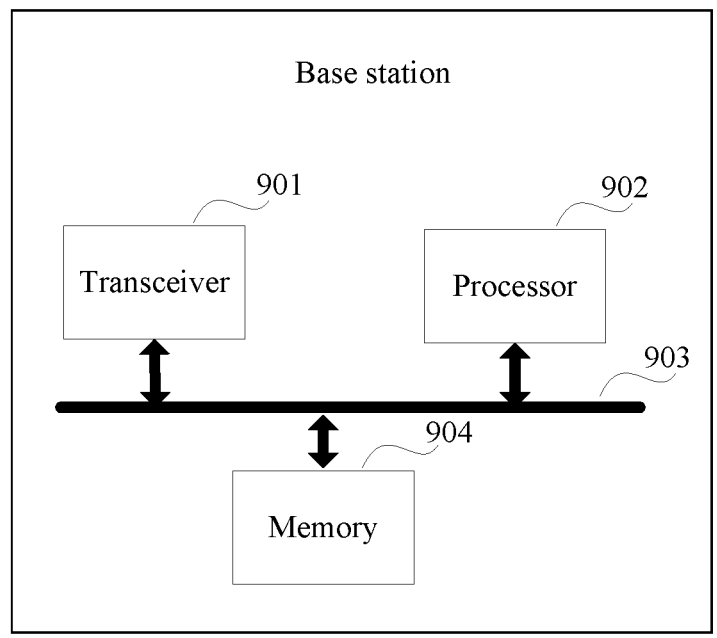
FIG. 9 is a schematic structural diagram of another base station according to an embodiment of the present invention.

An embodiment of the present invention further provides a base station. As shown in FIG. 9, the base station includes:

a transceiver 901, a processor 902, a bus 903, and a memory 904.

The transceiver 901, the processor 902, and the memory 904 are connected to each other by using the bus 903. The bus 903 may be a peripheral component interconnect (PCI) bus, an extended industry standard architecture (EISA) bus, or the like. The bus may be classified into an address bus, a data bus, a control bus, and the like. For convenience of denotation, the bus is represented by using only one bold line in FIG. 9; however, it does not indicate that there is only one bus or only one type of bus.

The memory 904 is configured to store an executable program.

The processor 902 is configured to execute the executable program stored in the memory 904, to execute the following:

determining, by the processor 902, radio frame configuration information;

sending, by the transceiver 901, the radio frame configuration information determined by the processor 902 to user equipment UE, where the radio frame configuration information is used to instruct the UE to set at least one of N consecutive downlink subframes of one radio frame as a first subframe, and/or the radio frame configuration information is used to instruct the UE to set at least one of M consecutive uplink subframes of one radio frame as a second subframe, where the first subframe is used for uplink service transmission, the second subframe is used for downlink service transmission, and N and M are positive integers not less than 2; and the processor 902 is configured to communicate with the UE by using a radio frame configured according to the radio frame configuration information.

Optionally, the first subframe includes a guard period and at least one first symbol used for uplink service transmission, and the guard period precedes the first symbol.

Specifically, the first subframe includes C symbols, where the first x symbols are the guard period, the last y symbols are an uplink pilot timeslot used for uplink service transmission, $x=C/2$, and $y=C/2$; or the first subframe includes C symbols, where the first x symbols are the guard period, the last y symbols are an uplink pilot timeslot used for uplink service transmission, $C=x+y$, and $x>C/2$.

Further, the first subframe further includes at least one second symbol used for downlink service transmission, and the second symbol precedes the guard period.

Specifically, the first subframe includes C symbols, where the first x symbols are a downlink pilot timeslot used for downlink service transmission, the last y symbols are an uplink pilot timeslot used for uplink service transmission, the middle z symbols are the guard period, $C=x+y+z$, and $x \leq C/2$; or the first subframe includes C symbols, where the first x symbols are a downlink pilot timeslot used for downlink service transmission, the last y symbols are an uplink pilot timeslot used for uplink service transmission, the middle z symbols are the guard period, $C=x+y+z$, $x<C/2$, and $y=C/2$.

Optionally, the second subframe includes a guard period and at least one third symbol used for downlink service transmission, and the guard period is preceded by the third symbol.

Specifically, the second subframe includes P symbols, where the first a symbols are a downlink pilot timeslot used for downlink service transmission, the last b symbols are the guard period, $a=P/2$, and $b=P/2$; or the second subframe includes P symbols, where the first a symbols are a downlink pilot timeslot used for downlink service transmission, the last b symbols are the guard period, $P=a+b$, and $a>P/2$.

Optionally, the second subframe further includes at least one fourth symbol used for uplink service transmission, and the fourth symbol is preceded by the guard period.

Specifically, the second subframe includes P symbols, where the first a symbols are a downlink pilot timeslot used for downlink service transmission, the last b symbols are an uplink pilot timeslot used for uplink service transmission, the middle w symbols are the guard period, $P=a+b+w$, and $a \leq P/2$; or the second subframe includes P symbols, where the first a symbols are a downlink pilot timeslot used for downlink service transmission, the last b symbols are an uplink pilot timeslot used for uplink service transmission, the middle w symbols are the guard period, $P=a+b+w$, $a<P/2$, and $b=P/2$.

Optionally, the transceiver 901 is specifically configured to:

send, for the base station, the radio frame configuration information to the UE by using a broadcast message; or send, for the base station, the radio frame configuration information to the UE by using radio resource control RRC dedicated signaling, Media Access Control MAC signaling, or physical downlink control channel PDCCH signaling.

Figure 10:
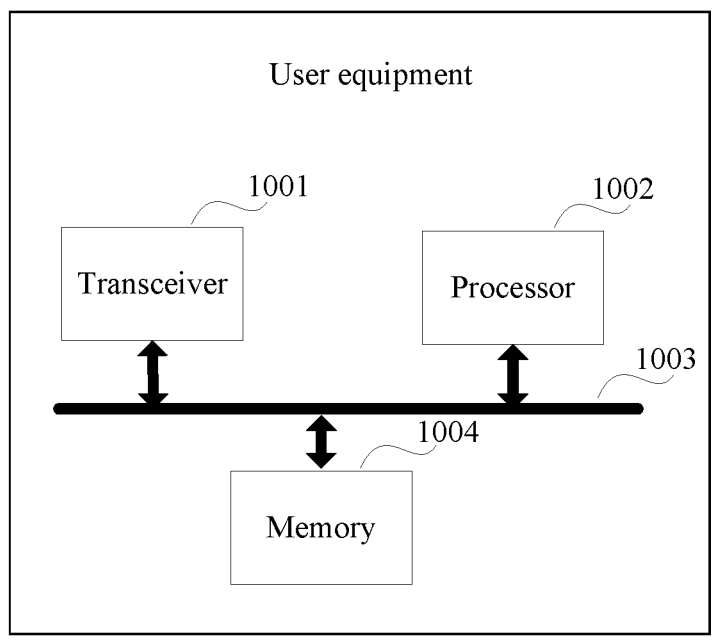
FIG. 10 is a schematic structural diagram of another user equipment according to an embodiment of the present invention.

An embodiment of the present invention provides user equipment. As shown in FIG. 10, the user equipment includes:

a transceiver 1001, a processor 1002, a bus 1003, and a memory 1004.

The transceiver 1001, the processor 1002, and the memory 1004 are connected to each other by using the bus 1003. The bus 1003 may be a peripheral component interconnect (PCI) bus, an extended industry standard architecture (EISA) bus, or the like. The bus may be classified into an address bus, a data bus, a control bus, and the like. For convenience of denotation, the bus is represented by using only one bold line in FIG. 10; however, it does not indicate that there is only one bus or only one type of bus.

The memory 1004 is configured to store an executable program.

The processor 1002 is configured to execute the executable program stored in the memory 1004, to execute the following:

receiving, by the transceiver 1001, radio frame configuration information sent by a base station; according to the radio frame configuration information received by the transceiver 1001, determining, by the processor 1002, that at least one of N consecutive downlink subframes of one radio frame is configured as a first subframe, and/or determining that at least one of M consecutive uplink subframes of one radio frame is configured as a second subframe, where the first subframe is used for uplink service transmission, the second subframe is used for downlink service transmission, and N and M are positive integers not less than 2; and communicating with the base station by using a radio frame determined according to the radio frame configuration information.

Optionally, the first subframe includes a guard period and at least one first symbol used for uplink service transmission, and the guard period precedes the first symbol.

Specifically, the first subframe includes C symbols, where the first x symbols are the guard period, the last y symbols are an uplink pilot timeslot used for uplink service transmission, $x=C/2$, and $y=C/2$; or the first subframe includes C symbols, where the first x symbols are the guard period, the last y symbols are an uplink pilot timeslot used for uplink service transmission, $C=x+y$, and $x>C/2$.

Further, the first subframe further includes at least one second symbol used for downlink service transmission, and the second symbol precedes the guard period.

Specifically, the first subframe includes C symbols, where the first x symbols are a downlink pilot timeslot used for downlink service transmission, the last y symbols are an uplink pilot timeslot used for uplink service transmission, the middle z symbols are the guard period, $C=x+y+z$, and $x \leq C/2$; or the first subframe includes C symbols, where the first x symbols are a downlink pilot timeslot used for downlink service transmission, the last y symbols are an uplink pilot timeslot used for uplink service transmission, the middle z symbols are the guard period, $C=x+y+z$, $x<C/2$, and $y=C/2$.

Optionally, the second subframe includes a guard period and at least one third symbol used for downlink service transmission, and the guard period is preceded by the third symbol.

Specifically, the second subframe includes P symbols, where the first a symbols are a downlink pilot timeslot used for downlink service transmission, the last b symbols are the guard period, $a=P/2$, and $b=P/2$; or the second subframe includes P symbols, where the first a symbols are a downlink pilot timeslot used for downlink service transmission, the last b symbols are the guard period, $P=a+b$, and $a>P/2$.

Further, the second subframe further includes at least one fourth symbol used for uplink service transmission, and the fourth symbol is preceded by the guard period.

Specifically, the second subframe includes P symbols, where the first a symbols are a downlink pilot timeslot used for downlink service transmission, the last b symbols are an uplink pilot timeslot used for uplink service transmission, the middle w symbols are the guard period, $P=a+b+w$, and $a \leq P/2$; or the second subframe includes P symbols, where the first a symbols are a downlink pilot timeslot used for downlink service transmission, the last b symbols are an uplink pilot timeslot used for uplink service transmission, the middle w symbols are the guard period, $P=a+b+w$, $a<P/2$, and $b=P/2$.

A person skilled in the art should understand that the embodiments of the present invention may be provided as a method, a system, or a computer program product. Therefore, the present invention may use a form of hardware-only embodiments, software-only embodiments, or embodiments with a combination of software and hardware. Moreover, the present invention may use a form of a computer program product that is implemented on one or more computer-usable storage media (including but not limited to a magnetic disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although embodiments of the present invention have been described, a person skilled in the art may make additional changes and modifications to these embodiments once learning about the basic inventive concepts. Therefore, the appended claims are intended to interpret as including the embodiments as well as all changes and modifications falling within the scope of the present invention.

Apparently, a person skilled in the art can make various modifications and variations to the embodiments of the present invention without departing from the spirit and scope of the embodiments of the present invention. The present invention is intended to cover these modifications and variations to the embodiments of the present invention provided that these modifications and variations fall within the scope of the claims of the present invention and their equivalent technologies.

What is claimed is:

1. A communication method in a time division duplex system, comprising:
   receiving, by a user equipment (UE), radio frame configuration information sent by a base station, wherein the radio frame configuration information is used to instruct at least one of:
   configuring each uplink subframe of one radio frame to two same consecutive uplink subframes of reduced length, wherein a total length of the one radio frame remains unchanged;
   configuring each downlink subframe of the one radio frame to two same consecutive downlink subframes of reduced length, wherein the total length of the one radio frame remains unchanged; or
   configuring each special subframe of the one radio frame to two same consecutive special subframes of reduced length, wherein the total length of the one radio frame remains unchanged; and
   communicating, by the UE, with the base station by using the radio frame determined according to the radio frame configuration information.

2. The method according to claim 1, wherein the receiving the radio frame configuration information comprises:
   receiving, by the UE, the radio frame configuration information sent by the base station by a broadcast message; or
   receiving, by the UE, the radio frame configuration information sent by the base station by radio resource control (RRC) dedicated signaling, Media Access Control (MAC) signaling, or physical downlink control channel (PDCCH) signaling.

3. The method according to claim 1, wherein the radio frame configuration information is further used to instruct:
   configuring at least one of a plurality of consecutive downlink subframes of the one radio frame to a first subframe, the first subframe is used for uplink service transmission; and/or
   configuring at least one of a plurality of consecutive uplink subframes of the one radio frame to a second subframe, the second subframe is used for downlink service transmission.

4. The method according to claim 3, wherein the first subframe comprises a guard period and at least one first symbol used for the uplink service transmission, and the guard period precedes the first symbol.

5. The method according to claim 3, wherein the first subframe further comprises at least one second symbol used for the downlink service transmission, and the second symbol precedes the guard period.

6. A base station, comprising:
   a processor; and
   a non-transitory computer-readable storage medium coupled to the processor and storing programming instructions for execution by the processor, the programming instructions instruct the processor to:
   determine radio frame configuration information, wherein the radio frame configuration information is used to instruct at least one of:
   configuring each uplink subframe of one radio frame to two same consecutive uplink subframes of reduced length, wherein a total length of the one radio frame remains unchanged;
   configuring each downlink subframe of the one radio frame to two same consecutive downlink subframes of reduced length, wherein the total length of the one radio frame remains unchanged; or
   configuring each special subframe of the one radio frame to two same consecutive special subframes of reduced length, wherein the total length of the one radio frame remains unchanged;
   send the radio frame configuration information to a user equipment (UE); and
   communicate with the UE by using the radio frame configured according to the radio frame configuration information.

7. The base station according to claim 6, wherein the programming instructions further instruct the processor to:
   send the radio frame configuration information to the UE by using a broadcast message; or
   send the radio frame configuration information to the UE by using radio resource control (RRC) dedicated signaling, Media Access Control (MAC) signaling, or physical downlink control channel (PDCCH) signaling.

8. The base station according to claim 6, wherein the radio frame configuration information is further used to instruct:
   configuring at least one of a plurality of consecutive downlink subframes of the one radio frame to a first subframe, the first subframe is used for uplink service transmission; and/or
   configuring at least one of a plurality of consecutive uplink subframes of the one radio frame to a second subframe, the second subframe is used for downlink service transmission.

9. The base station according to claim 8, wherein the first subframe comprises a guard period and at least one first symbol used for the uplink service transmission, and the guard period precedes the first symbol.

10. The base station according to claim 8, wherein the first subframe further comprises at least one second symbol used for the downlink service transmission, and the second symbol precedes the guard period.

11. A user equipment (UE), comprising:
    a processor; and
    a non-transitory computer-readable storage medium coupled to the processor and storing programming instructions for execution by the processor, the programming instructions instruct the processor to:
    receive radio frame configuration information sent by a base station, wherein the radio frame configuration information is used to instruct at least one of:
    configuring each uplink subframe of one radio frame to two same consecutive uplink subframes of reduced length, wherein a total length of the one radio frame remains unchanged;
    configuring each downlink subframe of the one radio frame to two same consecutive downlink subframes of reduced length, wherein the total length of the one radio frame remains unchanged; or
    configuring each special subframe of the one radio frame to two same consecutive special subframes of reduced length, wherein the total length of the one radio frame remains unchanged; and
    communicate with the base station by using the radio frame determined according to the radio frame configuration information.

12. The user equipment according to claim 11, wherein the programming instructions further instruct the processor to:
    receive the radio frame configuration information sent by the base station by a broadcast message; or
    receive the radio frame configuration information sent by the base station by radio resource control (RRC) dedicated signaling, Media Access Control (MAC) signaling, or physical downlink control channel (PDCCH) signaling.

13. The user equipment according to claim 11, wherein the radio frame configuration information is further used to instruct:
configuring at least one of a plurality of consecutive downlink subframes of the one radio frame to a first subframe, the first subframe is used for uplink service transmission; and/or
configuring at least one of a plurality of consecutive uplink subframes of the one radio frame to a second subframe, the second subframe is used for downlink service transmission.

14. The user equipment according to claim 13, wherein the first subframe comprises a guard period and at least one first symbol used for the uplink service transmission, and the guard period precedes the first symbol.

15. The user equipment according to claim 13, wherein the first subframe further comprises at least one second symbol used for the downlink service transmission, and the second symbol precedes the guard period.

16. A non-transitory computer-readable storage medium comprising instructions which, when executed by a processor in a user equipment (UE), configures the processor to:
receive radio frame configuration information sent by a base station, wherein the radio frame configuration information is used to instruct at least one of:
configuring each uplink subframe of one radio frame to two same consecutive uplink subframes of reduced length, wherein a total length of the one radio frame remains unchanged;
configuring each downlink subframe of the one radio frame to two same consecutive downlink subframes of reduced length, wherein the total length of the one radio frame remains unchanged; or
configuring each special subframe of the one radio frame to two same consecutive special subframes of reduced length, wherein the total length of the one radio frame remains unchanged; and
communicate with the base station by using the radio frame determined according to the radio frame configuration information.

17. The medium according to claim 16, wherein the instructions further instruct the processor to:
receive the radio frame configuration information sent by the base station by a broadcast message; or
receive the radio frame configuration information sent by the base station by radio resource control (RRC) dedicated signaling, Media Access Control (MAC) signaling, or physical downlink control channel (PDCCH) signaling.

18. The medium according to claim 16, wherein the radio frame configuration information is further used to instruct:
configuring at least one of a plurality of consecutive downlink subframes of the one radio frame to a first subframe, the first subframe is used for uplink service transmission; and/or
configuring at least one of a plurality of consecutive uplink subframes of the one radio frame to a second subframe, the second subframe is used for downlink service transmission.

19. The medium according to claim 16, wherein the first subframe comprises a guard period and at least one first symbol used for the uplink service transmission, and the guard period precedes the first symbol.

20. The medium according to claim 16, wherein the first subframe further comprises at least one second symbol used for the downlink service transmission, and the second symbol precedes the guard period.

* * * * *